United States Patent [19]

Edwards et al.

[11] Patent Number: 4,504,095
[45] Date of Patent: Mar. 12, 1985

[54] WELDED DROP-CENTER VEHICLE WHEELS

[75] Inventors: Michael F. Edwards, Wolverhampton; John D. Mabon, Leicester, both of England

[73] Assignee: GKN Sankey Limited, England

[21] Appl. No.: 962,345

[22] Filed: Nov. 20, 1978

Related U.S. Application Data

[63] Continuation-in-part of Ser. No. 822,512, Aug. 8, 1977, abandoned, which is a continuation of Ser. No. 598,656, Jul. 24, 1975, abandoned.

[30] Foreign Application Priority Data

Jul. 29, 1974 [GB] United Kingdom ............... 33296/74
Apr. 22, 1978 [GB] United Kingdom ............... 16001/78

[51] Int. Cl.³ .............................................. B60B 3/02
[52] U.S. Cl. ................................................. 301/63 R
[58] Field of Search .................. 301/63 R, 645 D, 97; 29/159.01, 159.1; 152/381.1, 381.2

[56] References Cited

U.S. PATENT DOCUMENTS 3,102,608  9/1963  Isbell et al. ..................... 301/63 R
3,210,126 10/1965  Travers ............................. 301/63 R
3,661,425  5/1972  Verdier ............................. 301/63 R
3,683,479  8/1972  Lejeune ............................ 301/63 R
3,787,092  1/1974  Weegen et al. .................... 301/63 R

FOREIGN PATENT DOCUMENTS 345549  3/1960  Switzerland ................... 301/13 SM

OTHER PUBLICATIONS

"The Development of the Modern Truck Discwheel", J. N. Bradley, Society of Automotive Engineers, Detroit, MI, Jan. 12–16, 1970.
"Budd Wide Single Tire Wheels", Budd Automotive, Detroit 15, MI, catalog B-163, (1963).

*Primary Examiner*—Charles A. Marmor
*Attorney, Agent, or Firm*—Marshall, O'Toole, Gerstein, Murray & Bicknell

[57] ABSTRACT

A disc wheel or demountable rim assembly for a vehicle comprising an asymmetrical drop-center rim with one bead seat spaced from the well by a ledge in which the disc or an adaptor band is welded to the rim with a T-butt weld adjacent the transition between said one bead seat and the ledge.

12 Claims, 6 Drawing Figures

| RIM SIZE | A | C | B | E | H |
|---|---|---|---|---|---|
| 22.5 X 5.25 | 5.25 ± .125 | 1.50 | 1.10 | 1.25 | 1.17 |
| 22.5 X 6.00 | 6.00 ± .125 | 1.75 | 1.45 | 1.45 | 1.17 |
| 22.5 X 6.75 | 6.75 ± .125 | 2.00 | 1.50 | 1.65 | 1.17 |
| 22.5 X 7.50 | 7.50 ± .125 | 2.20 | 1.60 | 1.80 | 1.17 |
| 24.5 X 7.50 | 7.50 ± .125 | 2.20 | 1.60 | 1.80 | 1.17 |
| 22.5 X 8.25 | 8.25 ± .125 | 2.20 | 1.60 | 1.80 | 1.17 |
| 24.5 X 8.25 | 8.25 ± .125 | 2.20 | 1.60 | 1.80 | 1.17 |
| 22.5 X 9.00 | 9.00 ± .125 | 2.20 | 1.60 | 1.80 | 1.17 |
| 24.5 X 9.00 | 9.00 ± .125 | 2.20 | 1.60 | 1.80 | 1.17 |
| 19.5 X 10.50 | 10.50 ± .187 | 2.20 | 1.60 | 1.80 | 1.17 |
| 19.5 X 11.75 | 11.75 ± .187 | 2.20 | 1.60 | 1.80 | 1.17 |
| 22.5 X 11.75 | 11.75 ± .187 | 2.20 | 1.60 | 1.80 | 1.17 |
| 19.5 X 12.25 | 12.25 ± .187 | 2.20 | 1.60 | 1.80 | 1.17 |
| 22.5 X 12.25 | 12.25 ± .187 | 2.20 | 1.60 | 1.80 | 1.17 |
| 19.5 X 13.00 | 13.00 ± .187 | 2.20 | 1.60 | 1.80 | 1.17 |
| 22.5 X 13.00 | 13.00 ± .187 | 2.20 | 1.60 | 1.80 | 1.17 |
| 19.5 X 14.00 | 14.00 ± .187 | 2.20 | 1.60 | 1.80 | 1.17 |
| 22.5 X 14.00 | 14.00 ± .187 | 2.20 | 1.60 | 1.80 | 1.17 |
| 19.5 X 15.00 | 15.00 ± .187 | 2.20 | 1.60 | 1.80 | 1.17 |

| NOMINAL RIM SIZE (inch) | A (± 0.125) (inch) | B (minimum) (inch) |
|---|---|---|
| 5.25 × 17.5<br>5.25 × 19.5 | 5.25 | 1.10<br>1.10 |
| 6.00 × 17.5<br>6.00 × 19.5 | 6.00 | 1.10<br>1.45 |
| 6.75 × 17.5<br>6.75 × 19.5 | 6.75 | 1.10<br>1.50 |
| 7.50 × 17.5<br>7.50 × 19.5 | 7.50 | 1.19<br>1.60 |
| 8.25 × 17.5<br>8.25 × 19.5 | 8.25 | 1.19<br>1.60 |
| 9.00 × 19.5 | 9.00 | 1.60 |

WELDED DROP-CENTER VEHICLE WHEELS

CROSS REFERENCES TO RELATED APPLICATIONS

This application is a continuation in part of copending application, Ser. No. 822,512, filed Aug. 8, 1977, now abandoned which in turn is a continuation of application, Ser. No. 598,656, filed July 24, 1975, also abandoned.

BACKGROUND OF THE INVENTION

This invention relates to wheels for vehicles.

The invention is concerned with disc wheels or demountable rim assemblies of the kind comprising (1) an asymmetrical rim having first and second axially spaced bead seats separated by a well and a ledge between the first bead seat and the well and (2) a disc or an adapter band welded to the rim. The ledge is often, but not always, generally cylindrical.

If the rim has a disc welded thereto then the rim and disc form a disc wheel which is hereinafter referred to as "being of the kind specified". If the rim has an adapter band welded thereto then a demountable rim assembly, hereinafter referred to as being "of the kind specified", is provided, the rim assembly being such as to be capable of being releaseably secured to a hub. Disc wheels and demountable rim assemblies of the kind specified are widely used with tubeless tires.

In our patent application, Ser. No. 822,512, filed Aug. 8, 1977, we claimed a disc wheel or a demountable rim assembly of the kind specified wherein the disc or adaptor band is T-joint fusion welded to the radially inner surface of the rim adjacent to the transition from the first bead seat to the ledge so that the axially inner edge of the disc or band adjacent to the well is located within a distance B/5 (as therein defined) of the transition between the ledge and the first bead seat.

At the time that application was filed, certain standards for wheel manufacture were in existence, as illustrated, for example, by the table in FIG. 1 of the earlier application. Since that time, however, modifications have been made in some wheel standards in respect of the defined minimum bead seat length and it is the purpose of this continuation in part application to disclose the applicability of the present invention to wheels made either to the original or the modified wheel manufacturing standards, and to claim the invention with respect to such wheels.

When a rim of a disc wheel or assembly of the kind specified carries an inflated tire the rim is subjected to forces which cause an overall axial tension stress in the rim, i.e., parallel to the rotary axis of the wheel or assembly, and additional differential stresses in the radially inner and outer surfaces of the rim which are caused by bending of the rim section.

We have found that the overall stresses in the rim section due to an inflated tire are lower in that part of the rim section containing the first bead seat and the ledge than they are in the part of the rim section containing the second bead seat. As a result of our investigations we have found that there is an optimum position at which to weld the disc or adaptor band to a rim in a disc wheel or demountable rim assembly of the kind specified so as to have low stresses, and an absence of steep stress gradients, in the rim adjacent to the welds.

SUMMARY OF THE INVENTION

According to the invention, therefore, we provide a disc wheel or a demountable rim assembly of the kind specified wherein the disc or adaptor band is T-butt-welded to the radially inner surface of the rim adjacent to the transition from the first bead seat to the ledge.

The choice of this position to weld the two parts of the wheel or assembly together has a number of advantages. Firstly, the overall stress level in the regions surrounding the weld is low as compared with the stress levels in other parts of the rim. Secondly, the stress gradients adjacent the transition from the first bead seat to the ledge are less steep than in other parts of the rim section so that there is some latitude regarding the point of attachment of the rim to the disc or band over which the stress levels will not vary widely. Thus, within limits, discs or adaptor bands of different diameters can be used with the same rim thus to make wheels or assemblies having different offsets as required.

Thirdly, due to the T-butt configuration of the welded joint, the welds are easily accessible to automatic welding machinery which is an important advantage in the mass production of wheels and demountable rim assemblies. Moreover, it enables one to keep the weld away from the well which is desireable and to do this even with narrow wheels.

Finally, particularly for a disc wheel embodying the invention, the disc may have a substantial dish in it so that it is strong. With some previous constructions it has been necessary to use discs which are dished comparatively shallowly and therefore do not have the same strength as a substantially dished disc.

Preferably, the center line of the edge portion of the band or disc, when viewed in radial section, makes an angle of between 0° and 30° with a plane perpendicular to the rotary axis of the wheel or assembly and passing through the intersection of the center line and said inner surface to which the edge portion is welded, the edge portion extending away from the welded joint in a direction so as to lie partly within the first bead seat.

We have found that the optimum position for the disc or band relative to the rim is where the axially inner edge of the disc or band, i.e., the edge of the disc or the band adjacent to the well, is located at the transition between the ledge and the first bead seat. The edge of the disc or band thus lies under the first bead seat and can readily be machined to the appropriate shape. However, as mentioned above, there is a small low-stress area adjacent to the transition and we have found that the axially inner edge of the disc or band may be located within B/5 of the transition where B is as defined below.

There are various standards to which disc wheels and demountable rim assemblies of the kind specified are made, three authorities which publish standards are the Tire and Rim Association, Inc., the European Tire and Rim Technological Organization and the British Standards Institution. Any wheel or assembly will be made to one of these standards or to some other internationally acceptable standard and each standard defines a minimum bead seat length, i.e., a length, parallel to the rotary axis of the wheel or assembly, from the outer edge of bead seat to, for the first bead seat, the transition on the radially outer surface of the rim between the bead seat and the ledge. The dimension B is defined as the minimum bead seat length for the first bead seat, i.e., the bead seat adjacent to the ledge, of the standard to which the wheel or demountable rim assembly is made. When the invention was originally formulated in said earlier applications the distance B/5 according to all the above standards gave the correct range of the invention. However some standards have now changed and it is necessary to define the invention for these standards by certain defined values of B which correspond to those in the unmodified standards. For the standards which have not been modified the value of B is still taken from the standards.

BRIEF DESCRIPTION OF THE DRAWINGS

An embodiment of the invention will now be described in detail by way of example with reference to the accompanying drawings in which.

DESCRIPTION OF THE PREFERRED EMBODIMENTS

Figure 1:
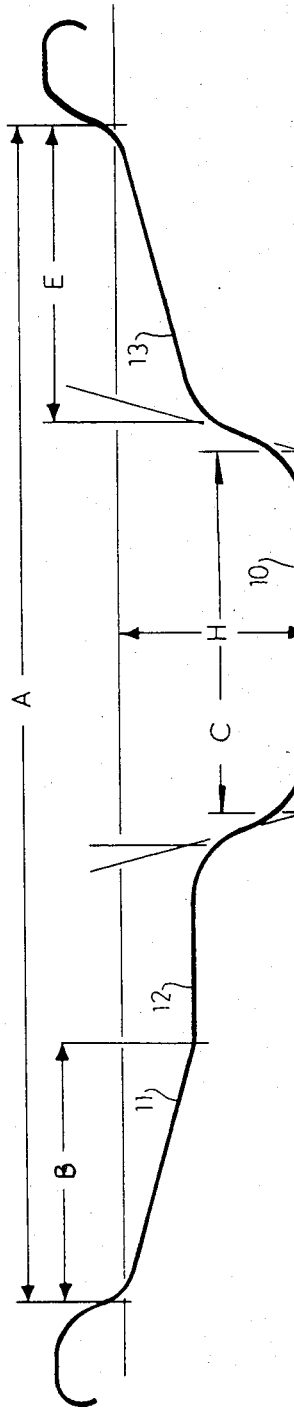
FIG. 1 is a reproduction from a standard of the Tire and Rim Association, Inc. Handbook for 15° drop centre rims, certain dimensions having been left our for clarity.

Referring first to FIG. 1, the rim contour there shown has a well indicated generally at 10, a first bead seat indicated generally at 11, a cylindrical ledge indicated generally at 12 and a second bead seat indicated generally at 13. It will be seen that there is a minimum dimension B for the length of the first bead seat 11. The minimum length is given in inches in column B in FIG. 1 for each nominal rim size. Thus by way of example the minimum dimension B for a wheel having the nominal rim size of 22.5"×7.50" is 1.60".

As will be described below, therefore, in a wheel made according to the standard shown in FIG. 1 the dimension B set out in the preceding description would be taken from the column B in FIG. 1 for the appropriate nominal rim size.

Figure 2:
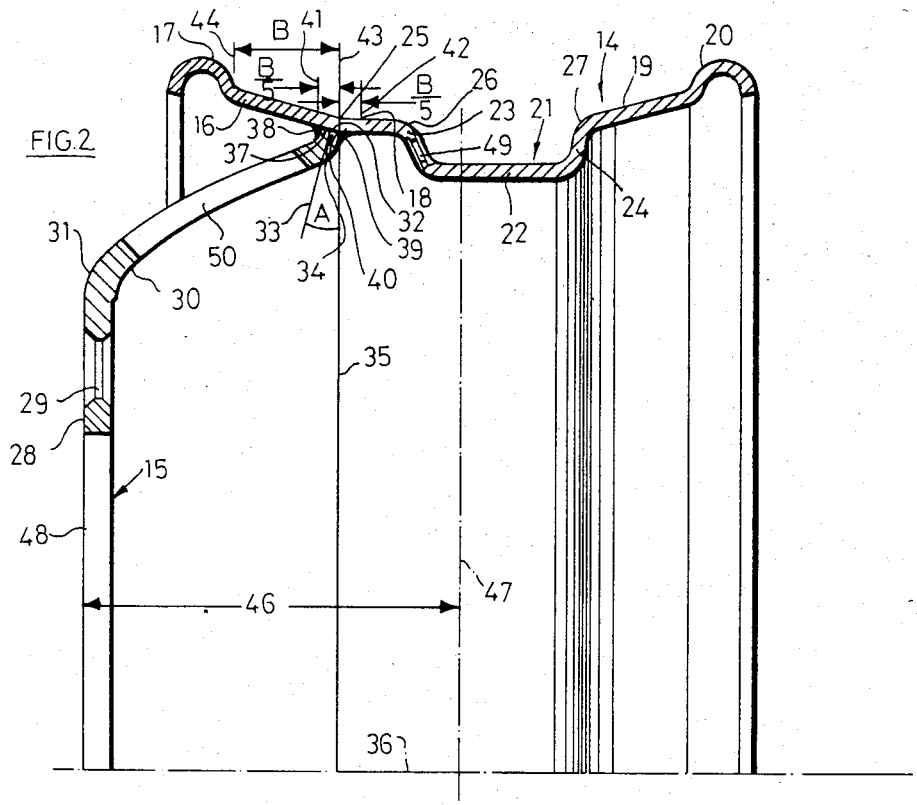
FIG. 2 is a half section through a disc wheel of the kind specified embodying the invention.

Referring now to FIG. 2, this shows a disc wheel embodying the invention of a size 22.5×7.50 and complying with the standard dimensions shown in FIG. 1 so that the minimum bead seat length of the first bead seat, i.e., the dimension B, is 1.60" so that B/5 is 0.32".

Referring to FIG. 2, the disc wheel there shown comprises a rim indicated generally at 14 and a disc indicated generally at 15. The rim section is such that it presents a first bead seat 16 having a surface inclined at 15° to the rotary axis of the wheel. At the outer edge of the first bead seat 16 there is a tire retaining flange 17 formed by bending over the material of the rim. Inwardly of the bead seat 16 is a cylindrical ledge 18. There is a second bead seat 19 at the outer edge of which is a further tire retaining flange 20. Between the bead seats 16 and 19 is a well indicated generally at 21 having a base 22 and side walls 23 and 24.

The rim is made out of strip material of constant thickness and the tire retaining flanges 17 and 20 are provided with sufficient curvature to provide the necessary strength. It is well known in the art that the greater the arc subtended by the flanges 17 and 20, the greater is the strength thereof and the more rigid is the rim section. There is a transition at 25 between the first bead seat 16 and the ledge 18. There is a radiused transition 26 between the ledge 18 and the well wall 23 and a further radiused transition 27 between the bead seat 19 and the well wall 24.

The disc 15 is welded to the inner surface of the rim adjacent to the transition 25 between the first bead seat 16 and the ledge 18.

Referring to the disc 15, this has a central planar portion 28 which is centrally apertured to give passage to the hub on to which it is to be fixed and has a number of spaced apertures 29 to receive the wheel studs. The disc has an outer frustoconical portion 30 which merges with the planar portion 28 through a radius 31. Adjacent the outer edge 32 of the disc the conical angle of the disc increases so that a center line 33 of the edge portion 34 of the disc makes an angle A, which in the present case is approximately 15°, with a plane 35 perpendicular to the rotary axis 36 of the wheel. The angle A is within the range 0° to 30° and the frustoconical portion 30 lies within the first bead seat 16, in other words, the disc proceeds from its welded junction with the rim in a direction generally away from the well rather than towards the well.

Figure 4:
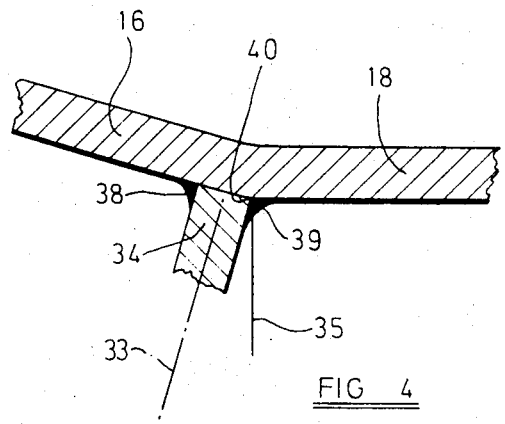
FIG. 4 is a detail view on a larger scale of the welded joint between the disc and the rim.

Preferably, as shown in FIG. 4, the center line 33 is normal to the inner rim surface 37 to which the edge portion of the disc is welded. As shown, the disc and rim are welded together by two welds, an axially outer weld 38 and an axially inner weld 39; if desired one of these welds could be omitted.

The axially inner edge 40 of the disc lies at the transition 25 between the bead seat 16 and the ledge 18, i.e., adjacent the plane 35 and this is the optimum position. However, the welded junction may be displaced somewhat from the optimum position shown. The inner edge 40 could be moved to the right or left in FIG. 2 until it lay on either of the lines 41 and 42 each of which is spaced by a distance B/5, measured parallel to the rotary axis 36, from the inner edge of the first bead seat 16, i.e., the line 43. The distance B is measured between the lines 43 and 44. Preferably the disc is moved to the left of its optimum position if this is not acceptable, so that the outer edge of the disc lies under the bead seat but the precise position of the disc will be determined by the physical constraints imposed by the situation in which the wheel is to be used.

The attachment of the disc to the rim in the manner described adjacent the transition 25 has a number of advantages. Firstly, the overall stresses in the rim in the attachment area are lower than in other parts of the rim when the latter carries an inflated tire.

Secondly, as will be seen from the drawing, there is easy access to both of the welds 38 and 39 for automatic welding equipment.

Thirdly, it will be seen that by moving the point of attachment of the disc within the range defined by the requirement that the inner edge of the disc lies between the lines 41 and 42 different off-sets are obtained, the off-set being indicated by the line 46 between the central plane 47 of the wheel and the outer face 48 of the central portion 28 of the disc. It will be seen that there will have to be some variation in the overall diameter of the disc for different off-sets but that this variation will be quite small and that standard discs can therefore be used and the amount of machining carried out at the edge of any particular disc being arranged to give the required off-set. It is not necessary to provide differently shaped discs for different off-sets, it is only necessary to vary the diameter of the disc.

Fourthly, the disc is provided with a considerable dish shape, i.e., there is a considerable distance between the plane 35 and the face 48 so that a strong disc is obtained.

Figure 3:
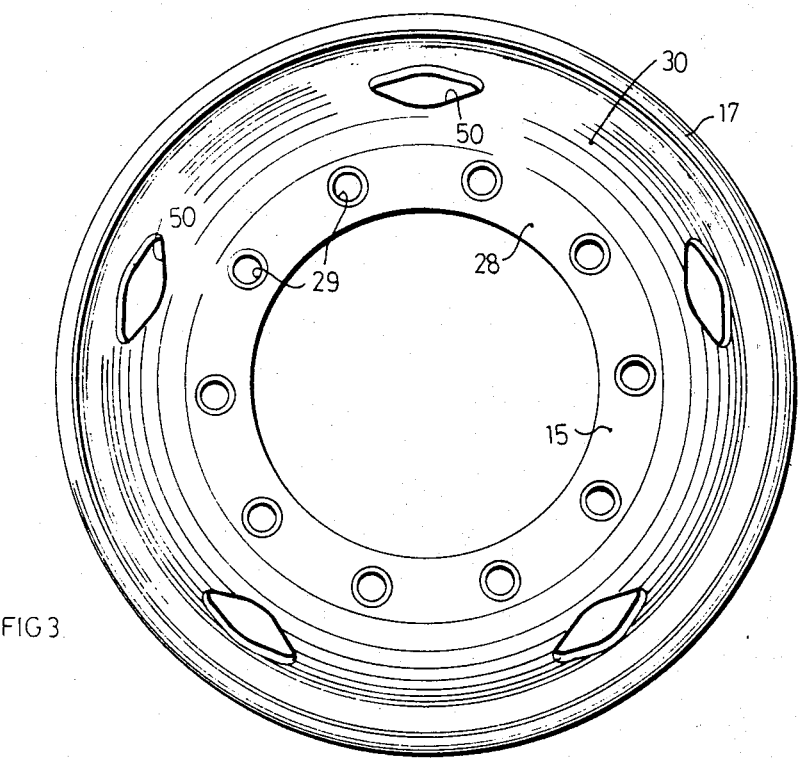
FIG. 3 is an elevation of a complete wheel of the construction shown in FIG. 2.

The wheel shown in FIGS. 2, 3, and 4 is intended to be used with a tubeless tire and there is shown, in FIG. 2, a valve hole 49. Five access holes 50 are provided around the outer part of the disc. The holes are arranged as close to the outer periphery of the disc as is practicable to provide drainage for water and dirt and to prevent the build up of water and dirt within the wheel.

Figure 5:
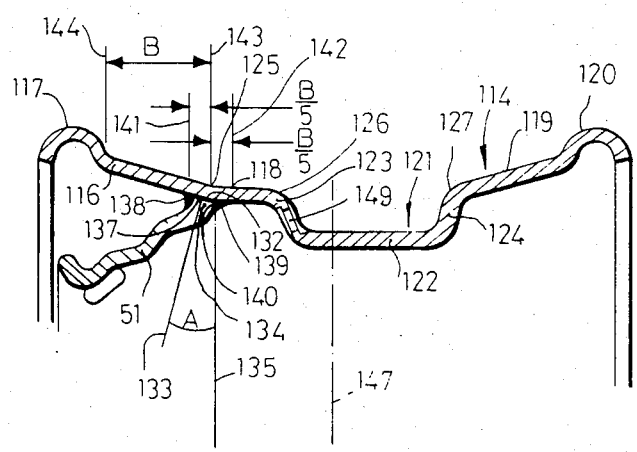
FIG. 5 is a view similar to FIG. 2 of a demountable rim assembly of the kind specified embodying the invention.

It will be seen that the invention provides a disc wheel of the kind specified having a very advantageous construction. The invention is also applicable to demountable rim assemblies as shown in FIG. 5 in which the disc 28 is replaced by an adaptor band 51 which is of similar frusto-conical shape to the part 30 but is adapted for releasably securing to a hub. The adaptor band is welded to the rim as described in relation to the disc with the same advantages. Parts in FIG. 5 which are identical to those in FIGS. 2 and 3 are given the same reference numerals with a prefix 1.

Figure 6:
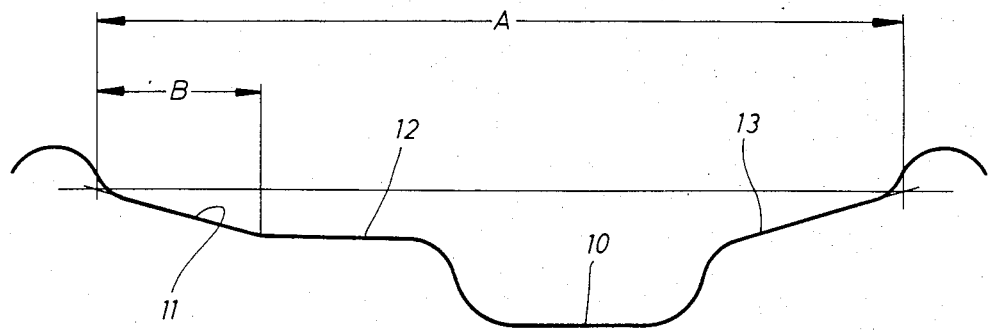
FIG. 6 is a reproduction of a standard, similar to FIG. 1, for certain additional wheel sizes.

Referring now to FIG. 6, the rim contour, similar to that shown in FIG. 1, has a well indicated at 10, a first bead seat 11, a cylindrical ledge 12 and a second bead seat 13. The table indicates the minimum dimension B for the length of the bead seat. As will be seen the length is given in inches in the column B of the table for each of the nominal rim sizes set out in the left hand column of the table.

For the reasons explained above, a disc or adaptor band is T-joint fusion welded to the radially inner surface of the rim adjacent to the transition of the first bead seat 11 to a ledge 12 so that the axially inner edge of the disc or band, i.e., the edge of the disc or band adjacent to the weld 10, is located within a distance B/5" of the transition between the ledge 12 and the first bead seat 11 where, for any particular wheel set out in the table accompanying the specification, B has the value shown in the right hand column.

Preferably, the center line of the edge portion of the band or disc, when viewed in radial section, makes an angle of between 0° and 30° with a plane perpendicular to the rotary axis of the wheel or assembly and passing through the intersection of the center line and said inner surface to which the edge portion is welded, the edge portion extending away from the welded joint in a direction so as to lie partly within the first bead seat. The center line may be perpendicular to said inner surface.

We have found that the optimum position for the disc or band relative to the rim is where the axially inner edge of the disc or band, i.e., the edge of the disc or the band nearer to the well, is located at the transition between the ledge and the first bead seat. The edge of the disc or band thus lies under the first bead seat and can readily be machined to the appropriate shape.

What is claimed is:

1. A disc wheel comprising:
   an asymmetrical rim having first and second axially spaced bead seats separated by a well and a ledge between the first bead seat and said well, and
   a dish-shaped disc having its edge portion T-butt welded to the radially inner surface of the rim at a point adjacent to the transition from the first bead seat to the ledge such that the side of said edge portion closer to the well is located within a distance B/5 of the transition between the ledge and the first bead seat (where B is the minimum bead seat length of the standard to which the rim is made), and
   wherein the center line of the edge portion of the disc, when viewed in radial section, makes an angle of between 0° and 30° with a plane perpendicular to the rotary axis of the wheel and passing through the intersection of the center line and said inner surface to which the edge portion is welded, the edge portion extending away from the welded joint in a direction so as to lie partly within the first bead seat.

2. The wheel of claim 1 wherein said center line is perpendicular to said inner surface.

3. A demountable rim assembly comprising:
   an asymmetrical rim having first and second axially spaced bead seats separated by a well, and a ledge between the first bead seat and said well, and
   an adaptor band having its edge portion T-butt welded to the radially inner surface of the rim at a point adjacent to the transition from the first bead seat to the ledge such that the side of said edge portion closer to the well is located within a distance B/5 of the transition between the ledge and the first bead seat (where B is the minimum bead seat length of the standard to which the rim is made);
   and wherein the center line of the edge portion of the band, when viewed in radial section, makes an angle of between 0° and 30° with a plane perpendicular to the rotary axis of the assembly and passing through the intersection of the center line and said inner surface to which the edge portion is welded, the edge portion extending away from the welded joint in a direction so as to lie partly within the first bead seat.

4. The assembly of claim 3 wherein said center line is perpendicular to said inner surface.

5. A disc wheel comprising:
   an asymmetrical rim of a nominal size selected from the group of sizes set out in FIG. 1 and having first and second axially spaced bead seats separated by a well and a ledge between the first bead seat and said well, and
   a dish-shaped disc having its edge portion T-butt welded to the radially inner surface of the rim at a point adjacent to the transition from the first bead seat to the ledge such that the side of said edge portion closer to the well is located within a distance B/5 of the transition between the ledge and the first bead seat (where B is the distance in inches shown in FIG. 1 against the selected rim size), and
   wherein the center line of the edge portion of the disc, when viewed in radial section, makes an angle of between 0° and 30° with a plane perpendicular to the rotary axis of the wheel and passing through the intersection of the center line and said inner surface to which the edge portion is welded, the edge portion extending away from the welded joint in a direction so as to lie partly within the first bead seat.

6. The wheel of claim 5 wherein said center line is perpendicular to said inner surface.

7. A disc wheel comprising:

an asymmetrical rim of a nominal size selected from the group of sizes set out in FIG. 6 and having first and second axially spaced bead seats separated by a well and a ledge between the first bead seat and said well, and a dish-shaped disc having its edge portion T-butt welded to the radially inner surface of the rim at a point adjacent to the transition from the first bead seat to the ledge such that the side of said edge portion closer to the well is located within a distance B/5 of the transition between the ledge and the first bead seat (where B is the distance in inches shown in FIG. 6 against the selected rim size), and wherein the center line of the edge portion of the disc, when viewed in radial section, makes an angle of between 0° and 30° with a plane perpendicular to the rotary axis of the wheel and passing through the intersection of the center line and said inner surface to which the edge portion is welded, the edge portion extending away from the welded joint in a direction so as to lie partly within the first bead seat.

8. The wheel of claim 7 wherein said center line is perpendicular to said inner surface.

9. A demountable rim assembly comprising:
an asymmetrical rim of a nominal size selected from the group of sizes set out in FIG. 1 and having first and second axially spaced bead seats separated by a well, and a ledge between the first bead seat and said well, and an adaptor band having its edge portion T-butt welded to the radially inner surface of the rim at a point adjacent to the transition from the first bead seat to the ledge such that the side of said edge portion closer to the well is located within a distance B/5 of the transition between the ledge and the first bead seat (where B is the distance in inches shown in FIG. 1 against the selected rim size);

and wherein the centre line of the edge portion of the band, when viewed in radial section, makes an angle of between 0° and 30° with a plane perpendicular to the rotary axis of the assembly and passing through the intersection of the center line and said inner surface to which the edge portion is welded, the edge portion extending away from the welded joint in a direction so as to lie partly within the first bead seat.

10. The assembly of claim 9 wherein said center line is perpendicular to said inner surface.

11. A demountable rim assembly comprising:
an asymmetrical rim of a nominal size selected from the group of sizes set out in FIG. 6 and having first and second axially spaced bead seats separated by a well, and a ledge between the first bead seat and said well, and an adaptor band having its edge portion T-butt welded to the radially inner surface of the rim at a point adjacent to the transition from the first bead seat to the ledge such that the side of said edge portion closer to the well is located within a distance B/5 of the transition between the ledge and the first bead seat (where B is the distance in inches shown in FIG. 6 against the selected rim size);

and wherein the centre line of the edge portion of the band, when viewed in radial section, makes an angle of between 0° and 30° with a plane perpendicular to the rotary axis of the assembly and passing through the intersection of the center line and said inner surface to which the edge portion is welded, the edge portion extending away from the welded joint in a direction so as to lie partly within the first bead seat.

12. The assembly of claim 11 wherein said center line is perpendicular to said inner surface.

* * * * *